Patented Nov. 29, 1949

2,489,359

UNITED STATES PATENT OFFICE 2,489,359

BENZOTRIAZINES

Frank J. Wolf, Westfield, and Karl Pfister, III,
Elizabeth, N. J., assignors to Merck & Co., Inc.,
Rahway, N. J., a corporation of New Jersey No Drawing. Application January 10, 1947,
Serial No. 721,476

5 Claims. (Cl. 260—249.5)

This invention relates to new organic chemical compounds having therapeutic activity, and to methods by which they may be prepared from readily available starting materials. More particularly the invention relates to the preparation of 7-halogen-3-(mono- and di-substituted amino)-benzotriazine-1,2,4 compounds, and to the chemical compounds so produced which are useful intermediates in the preparation of complex organic compounds including antimalarial agents and dyes.

The new compounds of the present invention are prepared from 7-halogen-3-chloro-benzotriazine-1,2,4 compounds by reacting with a mono- or di-substituted amine preferably by heating in an organic solvent such as carbon tetrachloride, and the like. The starting 3-chloro compounds can be prepared by reacting a 4-halogen-2-nitroaniline with phosgene in organic solvent solution, treating the reaction mixture thus obtained with anhydrous ammonia to form the corresponding 4-halogen-2-nitrophenyl urea, reacting this product with sodium hydroxide and then acidifying to precipitate the 7-halogen-3-hydoxy-benzotriazine-1,2,4-oxide-1, as fully disclosed in our companion application, Serial No. 721,470 filed January 10, 1947. The oxide is then reduced to the 7-halogen-3-hydroxy-benzotriazine-1,2,4 in the manner disclosed in our companion application Serial No. 721,474 filed January 10, 1947; and the same reacted with phosphorous oxychloride and a dialkyl aniline as disclosed in our companion application Serial No. 721,475 filed January 10, 1947, to form the 7-halogen-3-chloro-benzotriazine-1,2,4.

The reaction in forming the 3-(mono- and di-substituted amino) compounds can be represented as follows:

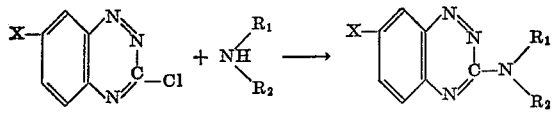

wherein $R_1$ is a hydrogen, alkyl, aryl, or aralkyl group; $R_2$ is an alkyl, aryl, or aralkyl group, and wherein $R_1$ and $R_2$ together form part of an N- or O-heterocyclic radical.

An alternate procedure for preparing the substituted amino compounds is by reduction of the oxide-1 form of the corresponding 3-(mono- or di-substituted amino) compound prepared as disclosed in our companion application Serial No. 721,472 filed January 10, 1947. The reduction is preferably carried out by reacting the oxide-1 compound with phosphorous and iodine preferably by heating to reflux in a suitable solvent such as glacial acetic acid. This reaction can be represented as follows:

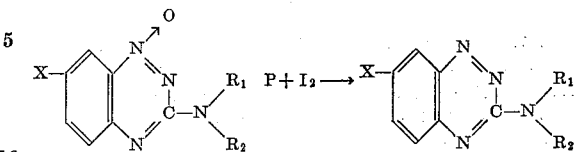

wherein $R_1$ is a hydrogen, alkyl, aryl, or aralkyl radical; $R_2$ is an alkyl, aryl, or aralkyl radical; and $R_1$ and $R_2$ together can form part of an N- or O-heterocyclic radical.

A third procedure possible for the preparation of 3-(mono-benzyl-amino) substituted compounds comprises reacting a 7-halogen-3-aminobenzotriazine-1,2,4 compound, prepared as described in our pending application Serial No. 661,083 filed April 10, 1946; or the corresponding oxide-1 compound prepared as described in our pending application Serial No. 661,084 filed April 10, 1946, with benzylamine, preferably by heating to reflux a mixture of the reactants. The same product, i. e. 7-halogen-3-(mono-benzylamino)-benzotriazine-1,2,4, is obtained from both starting materials, and is recovered as a precipitate which can readily be purified by recrystallization from Cellosolve.

The following examples show how procedures of the present invention can be carried out, but it is to be understood that these examples are given by way of illustration and not of limitation.

*Example 1*

A mixture of 9.7 gm. of 7-bromo-3-aminobenzotriazine-1,2,4-oxide-1 and 75 ml. of benzylamine were refluxed for 8 hours. The solution was cooled and poured into 500 ml. of methanol. The resulting precipitate was filtered and washed with 100 ml. of methanol. The crude product was recrystallized from Cellosolve. A yield of 5.0 gms. of 7-bromo-3-benzylamino - benzotriazine - 1,2,4, M. P. 172-3°, 40% of the theoretical amount was obtained.

*Example 2*

A mixture of 3.5 gms. of 7-chloro-3-aminobenzotriazine-1,2,4 and 15 ml. of benzylamine was heated at reflux for three-quarters of an hour. The solution was cooled and the resulting precipitate triturated with 25 ml. of ether and filtered. The yellow material was crystallized from Cellosolve and 4.2 gms. of 7-chloro-3-benzylamino-benzotriazine-1,2,4 was obtained, M. P. 175° C., 78% of the theoretical amount.

Example 3

One gram of 3,7-dichloro-benzotriazine-1,2,4 was dissolved in 10 cc. of CCl₄ with .73 gm. of n-butylamine and refluxed 10 hours. The n-butylamine hydrochloride formed in the reaction was filtered from the hot reaction mixture. On cooling the filtrate, a yellow precipitate of 7-chloro-3-n-butylamino-benzotriazine-1,2,4, M. P. 151–152°, was obtained in 50% yield.

Example 4

Two grams of red phosphorus and 1.0 gm. of iodine were dissolved in 50 ml. of glacial acetic acid. Then 5.0 gms. of 7-chloro-3-di-n-propyl-amino-benzotriazine - 1,2,4 - oxide-1 were added with 2 cc. of water and the solution refluxed for 1½ hours. The solution was filtered while hot and the acetic acid solution was concentrated to a small volume. The residue was recrystallized from an alcohol-water mixture. Obtained 3.3 gms. of 7-chloro-3-di-n-proplyamino-benzotriazine-1,2,4 71% M. P. 66°.

Example 5

By the process as described in Example 4 starting with 7-chloro-3-n-butylamino-benzotriazine-1,2,4-oxide-1, the compound 7-chloro-3-n-butyl-amino-benzotriazine-1,2,4, M. P. 150–1° C., is obtained in a 69% yield.

Example 6

By the process as described in Example 4 7-chloro-3-[(4-pentyl - 1 - diethylamino)-amino]-benzotriazine-1,2,4-oxide-1 is converted to 7-chloro-3[(4-pentyl - 1 - diethylamino) - amino]-benzotriazine-1,2,4, B. P. 70° C. at 3 microns.

Example 7

By the process as described in Example 4 7-chloro-3-N-methylanilino - benzotriazine - 1,2,4-oxide-1 is converted to 7-chloro-3-N-methyl-anilino-benzotriazine-1,2,4 M. P. 145–6° C., in 52% yield.

It will also be understood that many other 7-halogen-3(mono- and di-substituted amino)-benzotriazine-1,2,4-oxide-1 compounds, including all of such compounds disclosed in our copending application Serial No. 721,472, filed January 10, 1947, can be converted to the corresponding 7-halogen-3(mono- and di-substituted-amino)-benzotriazine-1,2,4 compounds by the process as described in Example 4.

Modifications can be made in the foregoing procedures without departing from the spirit and scope of the present invention and we are to be limited only by the appended claims.

We claim:

1. 7-halogen-benzotriazine-1,2,4 having in the 3-position a substituent selected from the class consisting of benzylamino (4-pentyl-1-diethylamino)-amino, N-methylanilino, n-butylamino, and di-n-propylamino radicals.

2. 7-halogen - 3 - benzylamino-benzotriazine-1,2,4.

3. 7-chloro - 3 - benzylamino-benzotriazine-1,2,4.

4. 7-chloro-3-[(4 - pentyl-1-diethylamino)amino]-benzotriazine-1,2,4.

5. 7-chloro-3-N-methylanilino - benzotriazine-1,2,4.

FRANK J. WOLF.
KARL PFISTER, III.

REFERENCES CITED

The following references are of record in the file of this patent:

UNITED STATES PATENTS

| Number | Name | Date |
|---|---|---|
| 2,197,357 | Widmer | Apr. 16, 1940 |

OTHER REFERENCES

Bischler, Berichte 22 (1889), pp. 2817, 2818, 2806.

Arndt Berichte 50 (1917), pp. 1248–1261.

Parkes, J. Chem. Soc. (1938), pp. 1842–1843.